US012718125B2

(12) United States Patent
Zonca et al.

(10) Patent No.: US 12,718,125 B2
(45) Date of Patent: Aug. 25, 2026

(54) APPLICATION OF LOCAL INTERPRETABLE MODEL-AGNOSTIC EXPLANATIONS ON DECISION SYSTEMS WITHOUT TRAINING DATA

(71) Applicant: Red Hat, Inc., Raleigh, NC (US)

(72) Inventors: Daniele Zonca, Milan (IT); Tommaso Teofili, Rome (IT)

(73) Assignee: Red Hat, Inc., Raleigh, NC (US)

( * ) Notice: Subject to any disclaimer, the term of this patent is extended or adjusted under 35 U.S.C. 154(b) by 1166 days.

(21) Appl. No.: 17/235,688

(22) Filed: Apr. 20, 2021

(65) Prior Publication Data

US 2022/0335315 A1 Oct. 20, 2022

(51) Int. Cl.
*G06N 5/045* (2023.01)
*G06N 20/00* (2019.01)

(52) U.S. Cl.
CPC ............. *G06N 5/045* (2013.01); *G06N 20/00* (2019.01)

(58) Field of Classification Search
CPC ........... G06N 5/045; G06N 20/00; G06N 3/08
See application file for complete search history.

(56) References Cited

U.S. PATENT DOCUMENTS 10,546,230 B2 1/2020 Kurata
10,970,629 B1 * 4/2021 Dirac ....................... G06N 7/01
11,636,360 B1 * 4/2023 Mishra ................ H04M 3/5166 706/12
2019/0188605 A1 6/2019 Zavesky et al.
2020/0167643 A1 * 5/2020 Bivens ..................... G06N 5/01
2020/0193243 A1 6/2020 Dhurandhar et al.
2020/0274880 A1 8/2020 Badawy et al.
2020/0279182 A1 * 9/2020 So .......................... G06N 20/00
2021/0365771 A1 * 11/2021 Speakman ............... G06N 3/08
2022/0067570 A1 * 3/2022 Kong ..................... G06V 20/46
2022/0101626 A1 * 3/2022 Lenga .................. G06V 10/776

OTHER PUBLICATIONS

Rodriguez-Perez et al., "Interpretation of Compound Activity Predictions from Complex Machine Learning Models Using Local Approximations and Shapley Values," Journal of medicinal chemistry 63.1:pp. 8761-8777 (Year: 2019).*

Ribeiro MT, Singh S, Guestrin C. "Why should i trust you?" Explaining the predictions of any classifier. InProceedings of the 22nd ACM SIGKDD international conference on knowledge discovery and data mining Aug. 13, 2016 (pp. 1135-1144). (Year: 2016).*

(Continued)

*Primary Examiner* — KC Chen

(74) *Attorney, Agent, or Firm* — Womble Bond Dickinson (US) LLP

(57) ABSTRACT

A method includes receiving input data that is used by a machine learning model to generate a first inference. The machine learning model was previously trained using a set of training data. The method also includes generating a set of modified input data based on the input data. The set of modified input data is generated without using the training data. The method further includes obtaining, from an explanation system, an explanation array. The explanation system is to generate the explanation array based on the machine learning model and the set of modified input data.

18 Claims, 5 Drawing Sheets

(56) References Cited

OTHER PUBLICATIONS

Laugel T, Renard X, Lesot MJ, Marsala C, Detyniecki M. Defining locality for surrogates in post-hoc interpretablity. arXiv preprint arXiv:1806.07498. Jun. 19, 2018. (Year: 2018).*
Tan, Pei-Yi, "Improving Model Interpretability with LIME," Artificial Intelligence article, Oct. 31, 2018, SAS Institute. Inc., https://blogs.sas.com/content/subconsciousmusings/2018/10/31/improving-model-interpretability-with-lime/.
Choudhary, Ankit, "Decoding the Black Box: An Important Introduction to Interpretable Machine Learning Models in Python," Aug. 26, 2018, Analytics Vidhya, https://www.analyticsvidhya.com/blog/2019/08/decoding-black-box-step-by-step-guide-interpretable-machine-learning-models-python/.

* cited by examiner

APPLICATION OF LOCAL INTERPRETABLE MODEL-AGNOSTIC EXPLANATIONS ON DECISION SYSTEMS WITHOUT TRAINING DATA

TECHNICAL FIELD

Aspects of the present disclosure relate to software explainability techniques, and in particular, to applying explainability techniques to decision systems.

BACKGROUND

Decision systems are often used to provide decisions, recommendations, inferences, etc., for various requests from users. For example, a decision system may approve a request from a user (e.g., may approve a request for a loan). In another example, as decision system may generate recommendations for patient treatment based on medical information of the user (e.g., patient). A decision system may be an automated system that provides (e.g., generates, makes, etc.) decisions for user requests based on a set of input. For example, the decisions may request information, documents, data, etc., from the user and may generate a decision automatically based on the provided information/data. A decision system may use artificial intelligence systems and/or technologies provide decisions for user requests. For example, a machine learning model, such as a neural network, may be used to provide/generate a decision based on user input.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
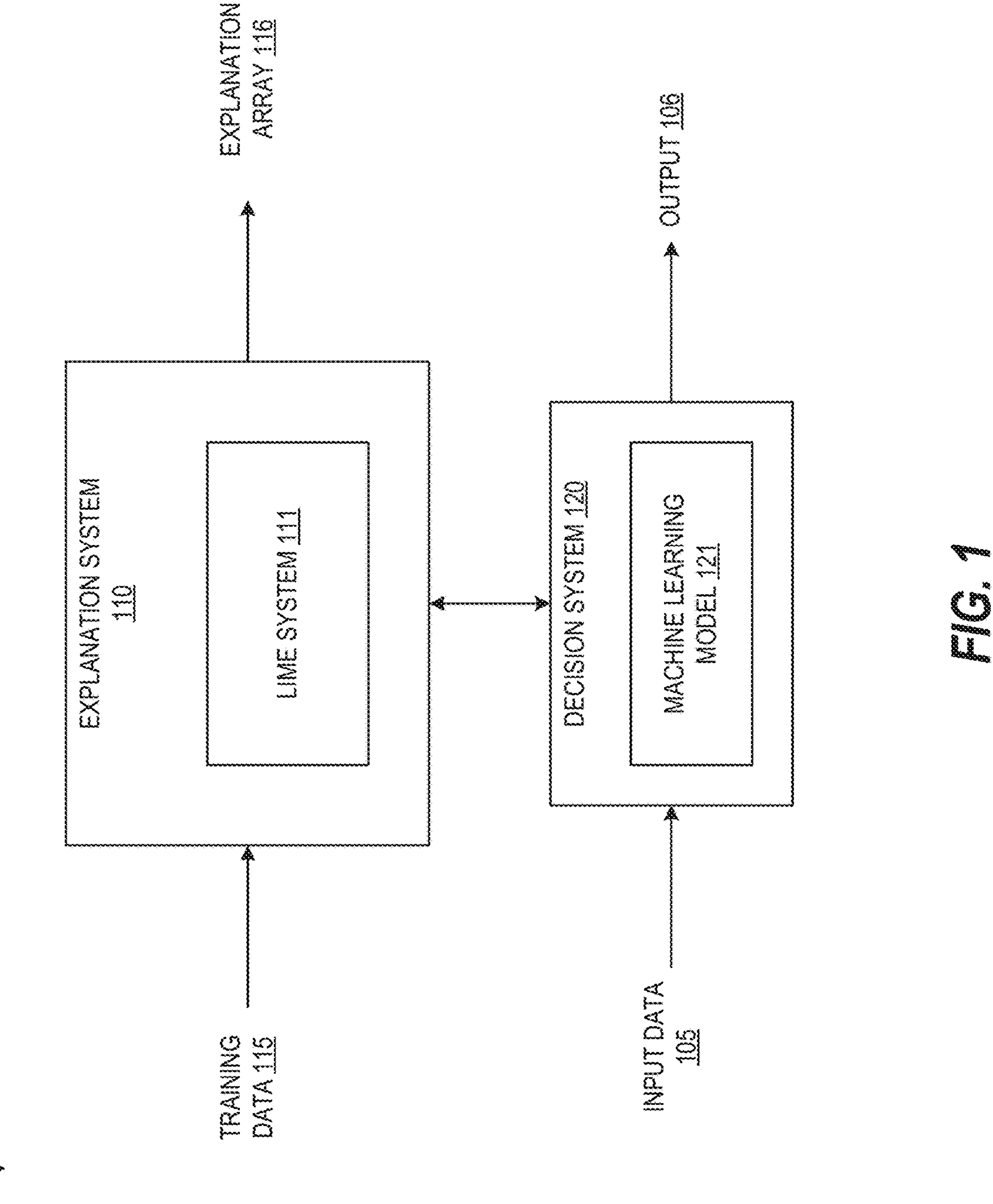
FIG. 1 is a block diagram illustrating an example system for applying an explanation system to a decision system, in accordance with some embodiments of the disclosure.

Explainability techniques, also referred to as explainable artificial intelligence (XAI), is a research area of artificial intelligence (AI) that attempts to make opaque decision systems (e.g., artificial intelligence (AI) systems, machine learning models, decision services, etc.) more interpretable and understandable for human users and stakeholders. Decision systems may provide recommendations (i.e., decisions) to a user based on input data provided to the decision system.

Decision systems, can be difficult to interpret and understand due to long lists of rules, complex or deep decision trees, black box machine learning models, and so forth. Additionally, decision systems may integrate AI systems to produce the decision output results which can add to the complexity of a decision system, making the process even less transparent. Explanation systems, such as local interpretable mode-agnostic explanations (LIME), can provide information about the underlying operation of a decision system (e.g., black-box machine learning model). The information provided by an explanation system may make the underlying decision systems more understandable, and therefore more trustworthy to human users, particularly in sensitive processes that directly affect humans in their real lives. A LIME system (which may implement a LIME algorithm) may use the training data that was used to train the decision system and may provide interpretable information about the operation of the decision system, in view of the decision system's use of the features in the training data. However, training data may not be available for an explanation system to use. For example, the training data may not be provided to or may not be accessible to the explanation system. In addition, some types of decision systems may not even use training data. For example, a rule-based decision system can be created and/or configured without using training data. When training data is not available or used, the explanation system (e.g., the LIME system) may be unable to determine the reasons why a particular output was generated from a particular input data.

Aspects of the disclosure address the above-noted and other deficiencies by providing a process for applying LIME techniques to decision systems even when training data is unavailable or was not used by the decision system. In some embodiments, a set of modified input data may be generated based on the input data that was provided to a decision system. The set of modified input data may be copies of the input data that have certain features modified (e.g., perturbed). The set of modified input may act as training data and may allow the LIME system to determine the importance of different features of the input data to the decision system (e.g., to generate the explanation array), even when training data is not available or is not used. Thus, embodiments of the present disclosure provide for the ability to use explanation systems (which use LIME systems) to analyze decision systems when training data is not available or is not used.

FIG. 1 is a block diagram illustrating an example system 100 for applying an explanation system 110 to a decision system 120, in accordance with some embodiments of the disclosure. System 100 includes explanation system 110 and decision system 120. Each of decision system 120 and explanation system 110 may include one or more computing devices. A computing device may include hardware such as processing device (e.g., processors, central processing units (CPUs)), memory (e.g., random access memory (e.g., RAM)), storage devices (e.g., hard-disk drive (HDD), solid-state drive (SSD), etc.—not shown), and other hardware devices (e.g., sound card, video card, etc.—not shown). In some embodiments, memory may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory may be configured for long-term storage of data and may retain data between power on/off cycles of the computing devices. Each computing device may comprise any suitable type of computing device or machine that has a programmable processor including, for example, server computers, desktop computers, laptop computers, tablet computers, smartphones, set-top boxes, etc. In some examples, each of decision system 120 and explanation system 110 may comprise a single machine or may include multiple interconnected machines (e.g., multiple servers configured in a cluster).

In one embodiment, the decision system 120 may be an algorithm, service, system, application, device, etc., for outputting a decision (e.g., an inference, a recommendation, etc.) based on provided input (e.g., input data 105). The decision system 120 may include a machine learning model 121 (e.g., a neural network). The machine learning model 121 may use the input data 105 to generate the output 106 (e.g., may generate an inference, decision, recommendation, etc., based on the input data 105). The input data 105 may be a set of features (e.g., a set of data, a set of data fields, a set of values, etc.) that may be used by the decision system 120 to generate output 106 (e.g., a decision, a recommendation, an inference, etc.).

In one embodiment, explanation system 110 may be an algorithm, application, service, system, device, etc., for identifying information indicating why the decision system 120 provides particular outputs (e.g., inferences, decisions, etc.) for input data 105. For example, the explanation system 110 may identify treatment options for a patient based on the patient's medical records (e.g., an example of input data 105), approve a request for a loan based on a user's financial information (e.g., an example of input data 105), etc.

In one example, the explanation system 110 may monitor execution of the decision system 120 and identify the inputs (e.g., a set of features, a feature, etc.) provided to the decision system 120. The explanation system 110 may generate a local model of the decision system 120 and execute the local model using training data that was used to train the decision system 120 (e.g., training data that was used to train a machine learning model, a neural network, etc.). The explanation system 110 may then use the results of the execution of local model with the varied inputs to provide an explanation array 116 including the reasons the decision system 120 provides a particular output. For example, the local model may be a linear model trained with the varied inputs to generate weights for each of the features of the training data 115. The weights for each feature may indicate a corresponding importance score for each feature.

The explanation system 110 includes LIME system 111. In one embodiment, the LIME system 111 may use the training data for a machine learning model, to determine why a machine learning model generated a particular output. For example, the LIME system 111 may use the training data to train a linear classifier (e.g., a linear classification model). The resulting linear model may include a weight for each feature of the input data 105. The corresponding weight for each feature of the input data 105 may be an importance score indicating a probability that the feature affects the outcome of the decision system 120. The LIME system 111 may associate the weights of importance scores with each of the corresponding features of the input data 105 to generate the explanation array 116 (e.g., the explanation array 116 may include a set of weights or importance scores for the features of the input data 105). The explanation array 116 may indicate why (e.g., what features were used) to generate the output 106 from the input data 105.

As discussed above, the explanation system 110 may use the training data 115 to determine, identify, generate, etc., the explanation array 116 and the explanation array 116 may include/indicate reasons why the decision system 120 provide the output 106 (e.g., a decision, an inference, a recommendation, etc.) based on the input data 105. Generally, the decision system 120 and/or the machine learning model 121 may be considered a black box or a black box application. For example, the internal weights of the machine learning model 121 may not be viewable or accessible. In another example, the rules of a rule based system (that is used by the decision system 120) may not be viewable or accessible. Thus, it may be difficult to determine why the output 106 was generated for the input data 105.

Although LIME system 111 of the explanation system 110 may attempt to identify the reasons that the output 106 was generated based on the input data 105 (e.g., may identify or determine how important different features of the input data 105 are to the output 106), the LIME system 111 uses training data 115 to train the linear classifier. However, the training data 115 is often not available or inaccessible to the explanation system 110. For example, the creators of the machine learning model 121 may choose not to release the training data 115. Thus, the LIME system 111 may be unable to generate the explanation array 116 if the LIME system 111 does not have access to the training data 115. In addition, if the decision system 120 uses a rule-based system (rather than machine learning model 121), then no training data would be available because rule-based systems may not use training data. For example, a rule-based system if often created without using any training data.

As discussed above, there may be instances where training data 115 is not available or is not used in the creation and/or configuration of the decision system 120. In those instances, it may not be possible for the explanation system 110 to determine the reasons why the output 106 was generated from the input data 105. Thus, it may be useful to allow the explanation system 110 (e.g., the LIME system 111) to be able to determine the reasons why the output 106 was generated from the input data 105 (e.g., to generate the explanation array 116), when training data 115 is unavailable or when the decision system 120 was not trained using the training data 115.

Figure 2:
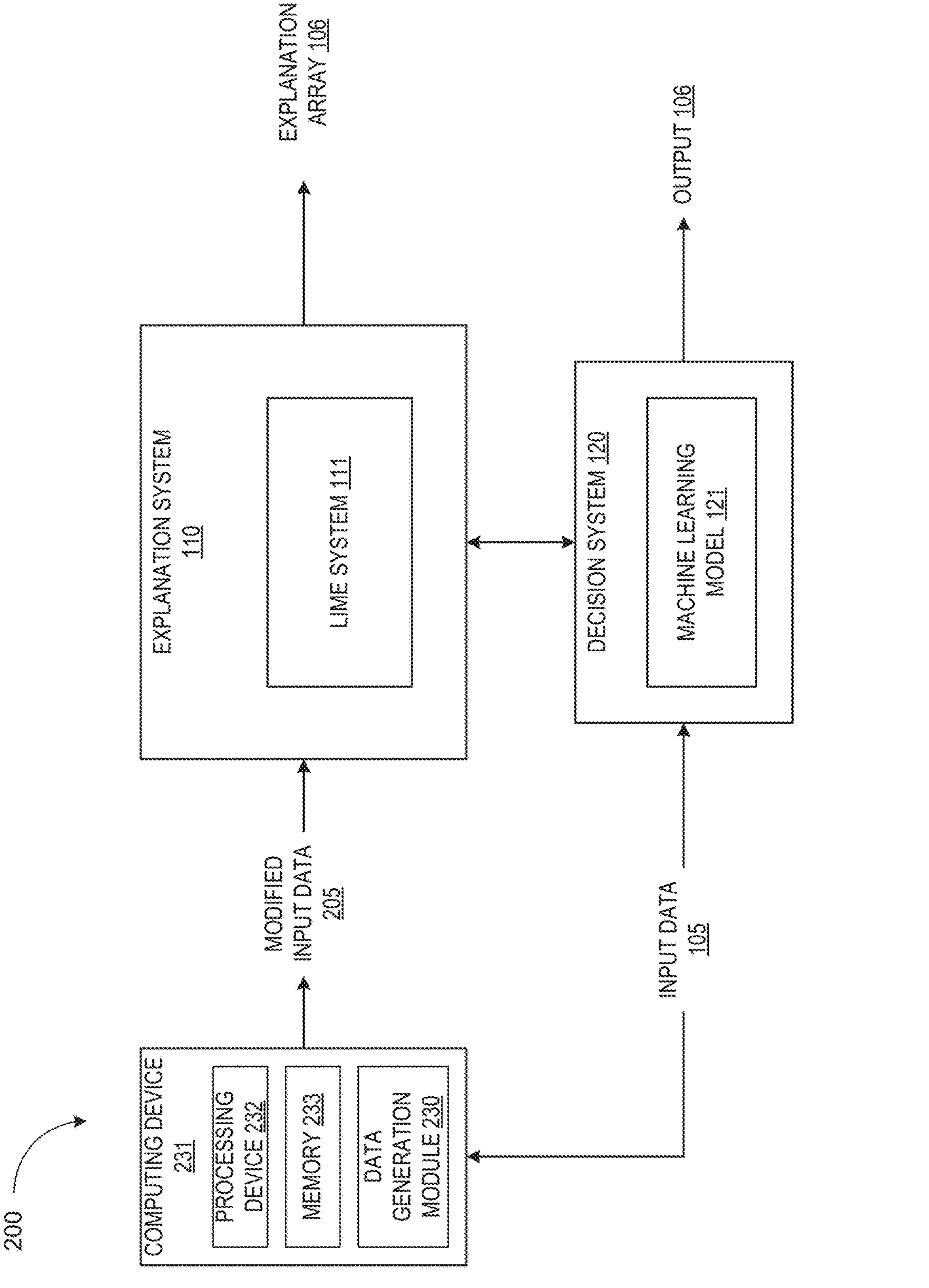
FIG. 2 is a block diagram illustrating a system for applying an explanation system to a decision system, in accordance with some embodiments of the disclosure.

FIG. 2 is a block diagram illustrating a system 200 for applying an explanation system 110 to a decision system 120, in accordance with some embodiments of the disclosure. System 200 includes a computing device 231, a decision system 120, and an explanation system 110. The decision system 120 may be a DMN™ service and may perform recommendations based on input data. For example, the decision system 120 may generate recommendations for patient treatment based on medical information of the patient. The decision system 120 may include a machine learning model 121 (e.g., a neural network). In other embodiments, the decision system 120 may include a rule-based system (e.g., a system that generates an output based on one or more rules—not shown). The decision system 120 may be used for any other type of input data, service, or circumstance. The explanation system 110 may be an algorithm, application, service, system, device, etc., for identifying information indicating why the decision system 120 provides particular outputs (e.g., inferences, decisions, etc.) for input data 105. The explanation system 110 includes a LIME system 111. The LIME system 111 may implement the LIME algorithm. Although depicted as separate components, computing device 231 and/or data generation module 230 may be a component of explanation system 110 (e.g., may be part of or included in explanation system 110).

As illustrated in FIG. 2, the computing device 231 includes a processing device 232 (e.g., processors, central processing units (CPUs)) a memory 233 (e.g., random access memory (e.g., RAM)), storage devices (e.g., hard-disk drive (HDD), solid-state drive (SSD), etc.—not shown), and other hardware devices (e.g., sound card, video card, etc.—not shown). The computing device 231 also includes a data generation module 230.

As discussed above, there may be instances where training data is not available or is not used in the creation and/or configuration of the decision system 120 (e.g., training data is not used for rule-based systems). In some embodiments, the computing device 231 and/or data generation module 230 may generate modified input data 205 data based on the input data 105. The data generation module 230 may provide the modified input data 205 to the explanation system 110 and/or the LIME system 111. The modified input data 205 may act as training data and may allow the LIME system 111 to determine the importance of different features of the input data 105, to the decision system 120 (e.g., to generate the explanation array 116), as discussed in more detail below.

In one embodiment, the data generation module 230 may obtain input data 105 (e.g., input data) that was provided to the decision system 120. For example, the input data 105 may be provided to both the data generation module 230 and the decision system 120. In another example, the data generation module 230 may access the input data 105 from a data store (e.g., a hard disk drive, a solid state disk drive, a memory, a storage area network, a cloud storage system, etc.). As discussed above, the decision system 120 may include a machine learning model 121 (e.g., a neural network) or some other AI/machine learning system, module, component, etc. The decision system 120 (e.g., the machine learning model 121) may generate an output 106 (e.g., a decision, inference, recommendation, etc.) based on the input data 105. The machine learning model 121 may have been previously generated based on a set of training data (e.g., training data 115 illustrated in FIG. 1). For example, the training data may have been provided to the machine learning model 121 to train or set the weights of the machine learning model.

In one embodiment, the data generation module 230 may generate modified input data 205 (e.g., a set of modified input data) based on the input data 105 (e.g., in view of the input data 105). For example, the data generation module 230 may obtain (e.g., create) copies of the input data 105 and may modify (e.g., perturb) each of the copies of the input data 105 to generate the modified input data 205, as discussed in more detail below. The modified input data 205 may be generated without using training data that was used to train the machine learning model 121. For example, the data generation module 203 may generate, create, etc., the modified input data 205 without using training data 115 (illustrated in FIG. 1). The modified input data 205 is discussed in more detail below.

In one embodiment, the data generation module 230 may obtain an explanation array 116 based on the modified input data 205. For example, the explanation system 110 may generate, determine, etc., the explanation array 116 based on the modified input data 205. The data generation module 230 may receive the explanation array 116 from the explanation system 110. The explanation array 116 may indicate one or more reasons why the machine learning model 121 and/or decision system 120 generated the output 106. The explanation array 116 may include a set of weights, scores, etc. Each weight/score may correspond to a feature (e.g., a field, a piece of data, etc.) in the input data 105. Each weight/score may indicate an importance of a respective feature in generating an output of the application from the input data.

Figure 3:
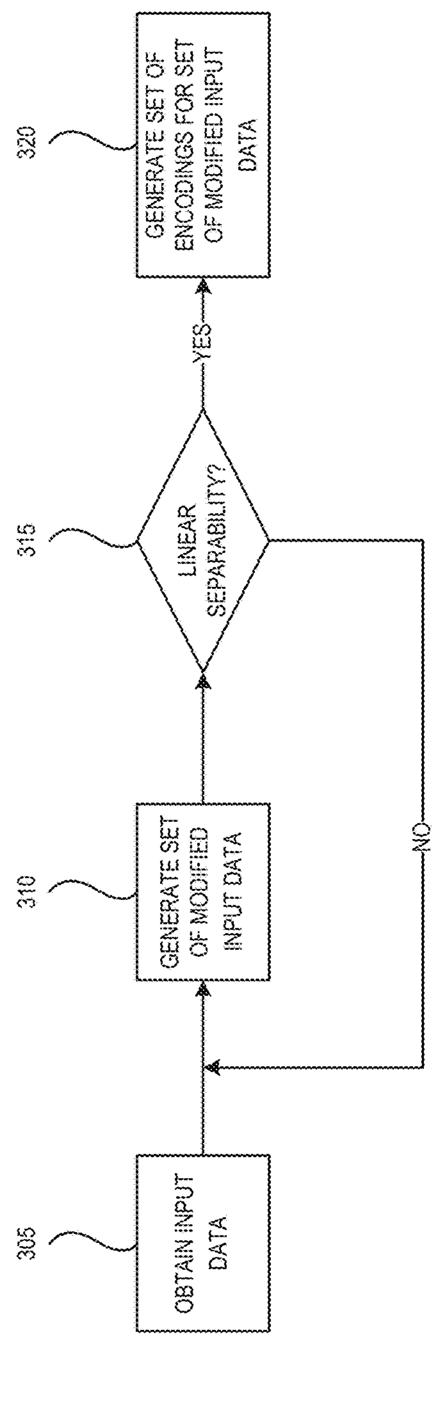
FIG. 3 is a flow diagram of a method of modifying the input data for an explanation system, in accordance with some embodiments of the disclosure.

FIG. 3 is a flow diagram of a method 300 of modifying the input data for an explanation system, in accordance with some embodiments of the disclosure. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 300 may be performed by a data generation module (e.g., data generation module 230 illustrated in FIG. 2).

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

The method 300 begins at block 305 where the processing logic obtains a set of input data. As discussed above, the input data may be provided to a decision system and/or a machine learning model. The decision system and/or machine learning model may generate an output (e.g., an inference, a decision, a recommendation, etc.) based on the input data.

At block 310, the processing logic may generate a set of modified input data (e.g., generate additional data) based on the input data. In one embodiment, the processing logic may generate the set of modified input data by obtaining (e.g., creating, generating, etc.) copies of the input data. The processing logic may modify the values of one or more features, values, fields, etc., in each of the copies of the input data, to obtain the set of modified input data.

In one embodiment, the set of input data may include multiple features. These features may also be referred to as values, fields, portions, etc. There may be may different types of features. For example, the input data may include numbers, text, etc. Different types of features may be modified (e.g., perturbed) differently, as discussed in more detail below. Modifying the different features of the input data may be referred to as perturbing the input data. The modifications to the input data may be referred to as perturbations.

In one embodiment, a feature may be a numeric feature (e.g., a number). To modify (e.g., perturb) a numeric feature, the processing logic may sample from a random distribution centered around the value of the numeric feature from the input data. For example, if the input data included the number 35 (e.g., a numeric feature), the processing logic may generate a modified input data have a different number selected from a standard distribution centered around 35.

In one embodiment, a feature may be a text feature (e.g., text). For example, the feature in the input data may be a sentence, a paragraph, or some other alphanumeric text. To modify (e.g., perturb) a text feature, the processing logic may remove a number of words from the text feature. For example, if the input data included a paragraph, the processing logic may randomly select a number of words from the paragraph and may remove them from the paragraph to generate the modified input data. The number of words to remove from a text feature may vary in different embodiments, for example, 10%, 25%, 50%, or some other appropriate number of words may be removed.

In one embodiment, a feature may be a category features or a categorical feature. For example, the value of a categorical feature may be one of asset of predefined values (e.g., male/female, age ranges, etc.). To modify (e.g., perturb) a categorical feature, the processing logic may randomly select a different one of the predefined values to generate the modified input data.

In one embodiment, a feature may be a binary feature. A binary feature may be data that is interpreted and/or executed by another application, service, etc. For example, a binary feature may be a binary file, such as a picture, an executable, a presentation, a portable document format (PDF) file, etc. In another example, binary features may be a file (or some other unit of data) that includes a series of "0"s and "1"s. To modify (e.g., perturb) a binary feature, the processing logic may randomly set different bits and/or bites of the binary feature to 0 or to 1. The number of bits/bytes that are randomly set to 0 or 1 may vary in different embodiments.

In one embodiment, a feature may be a Boolean feature. A Boolean feature may be a feature that has two possible values, such as true/false, 0/1, etc. To modify (e.g., perturb) a Boolean feature, the processing logic may change the Boolean feature to an opposite value (e.g., from a true to a false, or vice versa).

In one embodiment, a feature may be a currency feature (e.g., may represent an amount of currency, money, etc.). To modify (e.g., perturb) a currency feature, the processing logic may change the currency to a different type of currency. For example, the input data may include a currency feature in US dollars. The processing logic may change the currency feature to Japanese yen. The processing logic may also modify a currency feature by selecting a different number from a standard distribution centered the value of the currency features in the input data.

In one embodiment, a feature may be a time feature. A time feature may represent a date and/or time. For example, a time feature may be a time stamp. To modify (e.g., perturb) a time feature, a random amount of time (e.g., a random number of years, months, weeks, days, hours minutes, etc.) may be added or subtracted from the time feature.

In one embodiment, a feature may be a uniform resource identifier (URI) feature. For example, the URI may be a sequence of characters that identify a resource and/or a location for the resource. To modify (e.g., perturb) a URI feature, portions of the URI (e.g., the host name, the port number, etc.) may be removed.

In one embodiment, a feature may be a duration feature. For example, a duration feature may indicate the amount, duration, or period of time. To modify (e.g., perturb) a duration feature, the processing logic may change the duration feature to 0. The processing logic may also modify the duration feature by changing the duration to any appropriate value (e.g., a longer or shorter duration).

In one embodiment, a feature may be a vector feature. A vector feature may be a vector that includes one or more elements, such as numbers. To modify (e.g., perturb) a vector feature, the processing logic may change a random set of the elements to 0. For example, the processing logic may select a random 25%, 50%, etc., of the elements and set them to 0.

In one embodiment, a feature may be a structured feature. A structured feature may be a feature that have multiple levels, layers, or hierarchies of data. For example, a structured feature may be a nested data structure or data object (e.g., a data object that includes another data object). To modify (e.g., perturb) a structured feature, a number of features at each level/layer may be modified. For example, if a second layer/level includes four other features, a number (e.g., two) of the four other features may be modified.

At block 315, the set of modified input data may be analyzed to determine whether the set of modified input data is linearly separable. The set of modified input data may be linearly separable if the set of modified input data results a threshold of amount of different outputs when provided to the decision system and/or machine learning model. This may be referred to as a linear separability check.

In one embodiment, the processing logic may check the linear separability of the set of modified input data by providing the set of modified input data to the decision system and/or machine learning model. The decision system and/or machine learning model may generate a set of inferences for the set of modified input data. For example, the decision system and/or machine learning model may generate an inference for each modified input data in the set of modified input data. The processing logic may determine whether a threshold number/amount of the set of inferences differ from the inference that was generated using the input data (e.g., the original or first inference). For example, the processing logic may determine whether at least 10%, 25%, or some other appropriate number of the set of inferences differs from the first/original inference. If less than the threshold number/amount of the set of inferences differs from the first/original inference, the processing logic may proceed back to block 310 where the input data is modified to generate the set of modified input data. For example, different features may be modified and/or different values of the modified features may be used.

If at least the threshold number/amount of the set of inferences differs from the first/original inference, the processing logic may generate a set of encodings for the set of modified input data. In one embodiment, the set of encodings may be used by the explanation system (e.g., by a LIME system) to generate an explanation array based on the set of modified input data. For example, the explanation system may use both the set of modified input data and the set of encodings to determine, generate, calculate, obtain, etc., the explanation array.

In one embodiment, the set of encodings may be provided to a linear classifier (e.g., a linear model) of the explanation system. The set of encodings may include one or more numbers that represent the features in set of modified input data. The linear classifier may be trained using the set of encodings (e.g., the numbers that represent the features in the set of modified input data). Because the set of encodings and/or the set of modified input data may be used to train the linear classifier of the explanation system, it may be useful to reduce the chances that the values of the features in the set of modified input data vary too much from the original values of the original features in the input data.

In one embodiment, single, non-numerical features may be encoded in a sparse manner so that encoding is 0 if the feature differs from the original value, or is 1 if the feature is the same as the original value in the original input data. they are 0 if they differ from the original value or 1 if they have the same value. For numerical features (e.g., features that have numerical values), the processing logic may perform max-min scaling (e.g., feature scaling, min-max scaling, min-max normalization, etc.) of app sampled numbers (e.g., values) for that feature. A Gaussian kernel G, with $\mu=0$ (e.g., mu=0) and $\sigma=1$ (e.g., sigma=1) may be used to generate a threshold T, such that T=G ((original value-min)/

(max-min)). For each numerical feature (e.g. each number) X, V=G(X)−T is calculated. If V is lower than a threshold, then the numerical feature may be encoded or mapped to 1. If V is equal to or greater than a threshold, then the numerical feature may be encoded or mapped to 0. The threshold may vary in different embodiments. For example, the threshold may be 0.001, 0.02, or some other appropriate threshold value.

In one embodiment, the set of encodings may be a set of sparse vectors. Each sparse vector may correspond to one modified input of the set of modified inputs. Each sparse vector may include a set of elements and each element (of the set of elements) may have the value 0 or 1. Each element in a sparse vector may correspond to a feature of a modified input of the set of modified inputs.

Figure 4:
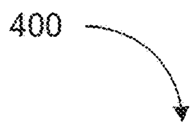
FIG. 4 is a flow diagram of a method of applying an explanation system to a decision system, in accordance with some embodiments of the disclosure.
Figure 4:
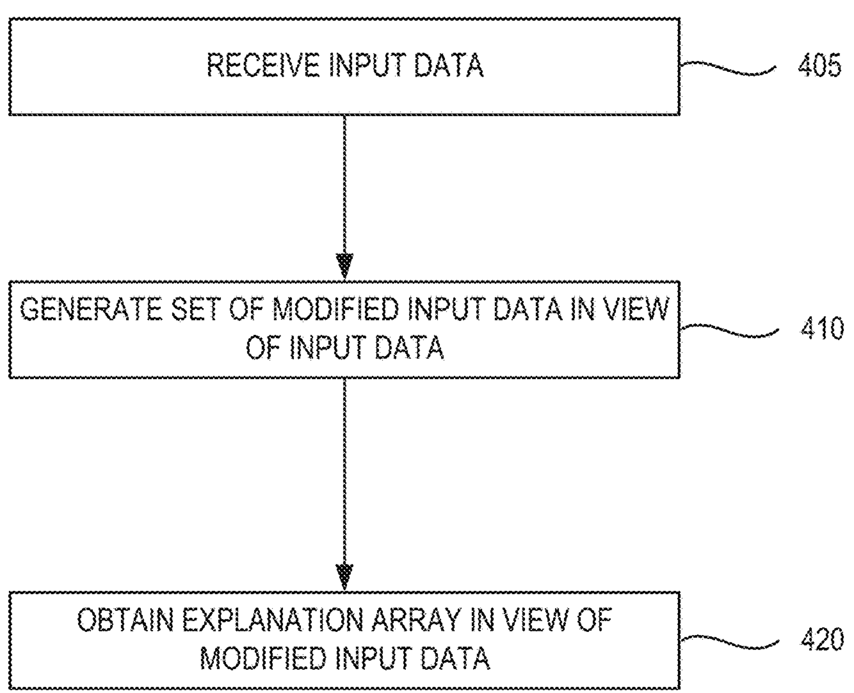

FIG. 4 is a flow diagram of a method 400 of applying an explanation system to a decision system, in accordance with some embodiments of the disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by a data generation module, such as data generation module 230 of FIG. 2.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at block 405, where the processing logic may receive the input data. For example, the processing logic may request the input data and/or may retrieve the input data from a data store. As discussed above, the input data may be used by a decision system to generate an output (e.g., an inference, decision, recommendation, etc.) based on the input data.

At block 410, the processing logic may generate a set of modified input data in view of the input data. The processing logic may generate the set of modified input data as described above in conjunction with FIG. 3. For example, the processing logic may create copies of the input data. The processing logic may modify (e.g., perturb) features of each of the copies of the input data to generate the set of modified input data. The processing logic may also generate a set of encodings for the set of modified input data, as discussed above.

At block 420, the processing logic may obtain an explanation array in view of the set of modified input data. For example, the processing logic may provide the set of modified input data and/or the set of encodings to an explanation system. The explanation system may generate the explanation array in view of the set of modified input data and/or the set of encodings to an explanation system. The explanation array may include weights for the features of the input data (e.g., one weight for each feature). The weight for each feature may indicate a corresponding importance score for the feature.

Figure 5:
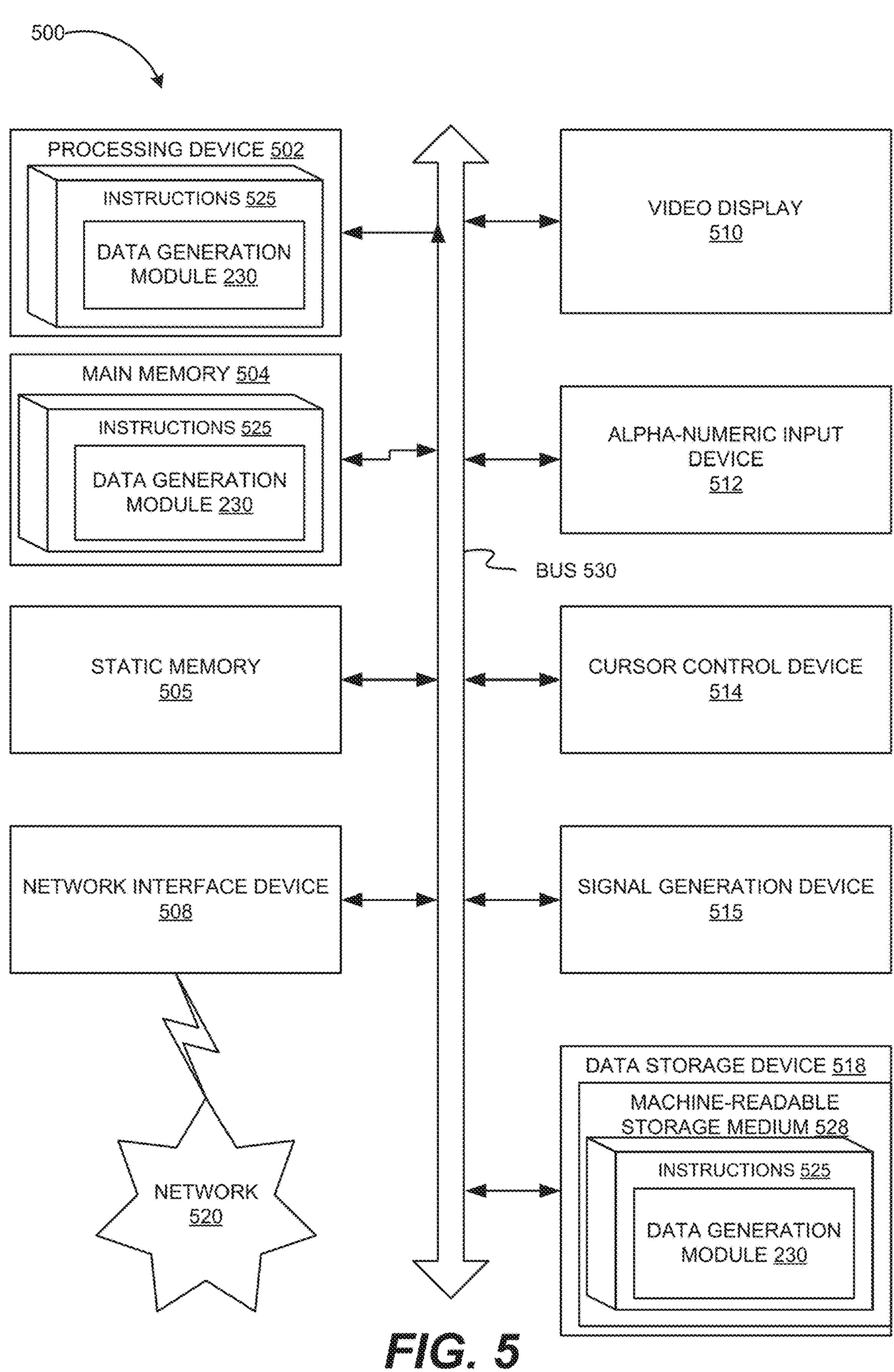
FIG. 5 is a block diagram of an example computing device that may perform one or more of the operations described herein, in accordance with some embodiments of the disclosure.

FIG. 5 is a block diagram of an example computing device 500 that may perform one or more of the operations described herein, in accordance with some embodiments of the disclosure. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general purpose processor, a PLD, etc.) 502, a main memory 504 (e.g., synchronous dynamic random access memory (DRAM), read-only memory (ROM)), a static memory 505 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also comprise one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may further include a network interface device 508 which may communicate with a network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 515 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 528 on which may be stored one or more sets of instructions 525 that may include instructions for a data generation module, e.g., data generation module 230 illustrated in FIG. 2, for carrying out the operations described herein, in accordance with one or more aspects of the present disclosure. Instructions 525 may also reside, completely or at least partially, within main memory 504 and/or within processing device 502 during execution thereof by computing device 500, main memory 504 and processing device 502 also constituting computer-readable media. The instructions 525 may further be transmitted or received over a network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:

receiving input data for a machine learning model, wherein:

the machine learning model was previously trained using a set of training data; and the machine learning model is to generate a first output in view of the input data;

generating, by a processing device, a set of modified input data in view of the input data, wherein the set of modified input data is generated based on copies of the input data, wherein values of one or more features of the copies of the input data are perturbed to generate the set of modified input data, wherein different types of perturbations are performed to the values of the one or more features based on different feature types of the one or more features;

analyzing the set of modified input data to determine that the set of modified input data is linearly separable, wherein determining that the set of modified input data is linearly separable comprises generating a set of outputs in view of the machine learning model and the set of modified input data, and determining that inferences for the set of modified input data differ from inferences for the input data by at least a threshold amount that a threshold amount of the set of outputs differs from the first output; and in response to determining that the threshold amount of the set of outputs differs from the first output, generating a set of encodings for the set of modified input data, and providing the set of modified input data and the set of encodings to an explanation system, wherein the set of training data is inaccessible to the explanation system; and obtaining an explanation array, wherein an the explanation system is to generate the explanation array in view of the machine learning model, and the set of modified input data, and the set of encodings, wherein the explanation array includes a set of weights associated with the one or more features of the input data and an indication of the one or more features utilized to generate the explanation array.

2. The method of claim 1, wherein generating the set of modified input data comprises:

obtaining a set of the copies of the input data.

3. The method of claim 1, wherein:

the set of encodings comprises a set of sparse vectors; and each sparse vector of the set of sparse vectors comprises a set of elements associated with features of the input data.

4. The method of claim 1, wherein the explanation array comprises a set of weights for features of the input data; and each weight of the set of weights indicates an importance of a respective feature in generating an output of the machine learning model from the input data.

5. The method of claim 1, wherein the machine learning model is part of a decision system.

6. The method of claim 1, wherein the explanation system comprises a local interpretable model-agnostic explanation (LIME) algorithm.

7. A system comprising:

a memory to store data; and a processing device operatively coupled to the memory, the processing device to:

receive input data for a machine learning model, wherein:

the machine learning model was previously trained using a set of training data; and the machine learning model is to generate a first output in view of the input data;

generate a set of modified input data in view of the input data, wherein the set of modified input data is generated based on copies of the input data, wherein values of one or more features of the copies of the input data are perturbed to generate the set of modified input data, wherein different types of perturbations are performed to the values of the one or more features based on feature types of the one or more features;

analyze the set of modified input data to determine that the set of modified input data is linearly separable, wherein determining that the set of modified input data is linearly separable comprises generating a set of outputs in view of the machine learning model and the set of modified input data, and determining that a threshold amount of the set of outputs differs from the first output that inferences for the set of modified input data differ from inferences for the input data by at least a threshold amount; and in response to determining that the threshold amount of the set of outputs differs from the first output, generate a set of encodings for the set of modified input data, and provide the set of modified input data and the set of encodings to an explanation system, wherein the set of training data is inaccessible to the explanation system; and obtain an explanation array, wherein an the explanation system is to generate the explanation array in view of the machine learning model, and the set of modified input data, and the set of encodings, wherein the explanation array includes a set of weights associated with the one or more features of the input data and an indication of the one or more features utilized to generate the explanation array.

8. The system of claim 7, wherein to generate the set of modified input data, the processing device is further to:

obtain a set of the copies of the input data.

9. The system of claim 7, wherein:

the set of encodings comprises a set of sparse vectors; and each sparse vector of the set of sparse vectors comprises a set of elements associated with features of the input data.

10. The system of claim 7, wherein the explanation array comprises a set of weights for features of the input data; and each weight of the set of weights indicates an importance of a respective feature in generating an output of the machine learning model from the input data.

11. The system of claim 7, wherein the machine learning model is part of a decision system.

12. The system of claim 7, wherein the explanation system comprises a local interpretable model-agnostic explanation (LIME) algorithm.

13. A non-transitory computer-readable storage medium including instructions that, when executed by a processing device, cause the processing device to:

receive input data for a machine learning model, wherein:

the machine learning model was previously trained using a set of training data; and the machine learning model is to generate a first output in view of the input data;

generate, by the processing device, a set of modified input data in view of the input data, wherein the set of modified input data is generated based on copies of the input data, wherein values of one or more features of the copies of the input data are perturbed to generate the set of modified input data, wherein different types of perturbations are performed to the values of the one or more features based on different feature types of the one or more features;

analyze the set of modified input data to determine that the set of modified input data is linearly separable, wherein determining that the set of modified input data is linearly separable comprises generating a set of outputs in view of the machine learning model and the set of modified input data, and determining that a threshold amount of the set of outputs differs from the first output; that inferences for the set of modified input data differ from inferences for the input data by at least a threshold amount; and in response to determining that the threshold amount of the set of outputs differs from the first output, generate a set of encodings for the set of modified input data, and provide the set of modified input data and the set of encodings to an explanation system, wherein the set of training data is inaccessible to the explanation system; and obtain an explanation array, wherein an the explanation system is to generate the explanation array in view of the machine learning model, and the set of modified input data, and the set of encodings, wherein the explanation array includes a set of weights associated with the one or more features of the input data and an indication of the one or more features utilized to generate the explanation array.

14. The non-transitory computer-readable storage medium of claim 13, wherein to generate the set of modified input data, the instructions, when executed by the processing device, is further to cause the processing device further to: obtain a set of the copies of the input data.

15. The non-transitory computer-readable storage medium of claim 13, wherein:

the set of encodings comprises a set of sparse vectors; and each sparse vector of the set of sparse vectors comprises a set of elements associated with features of the input data.

16. The non-transitory computer-readable storage medium of claim 13, wherein each weight of the set of weights indicates an importance of a respective feature in generating an output of the machine learning model from the input data.

17. The non-transitory computer-readable storage medium of claim 13, wherein the machine learning model is part of a decision system.

18. The non-transitory computer-readable storage medium of claim 13, wherein the explanation system comprises a local interpretable model-agnostic explanation (LIME) algorithm.

* * * * *